United States Patent Office.

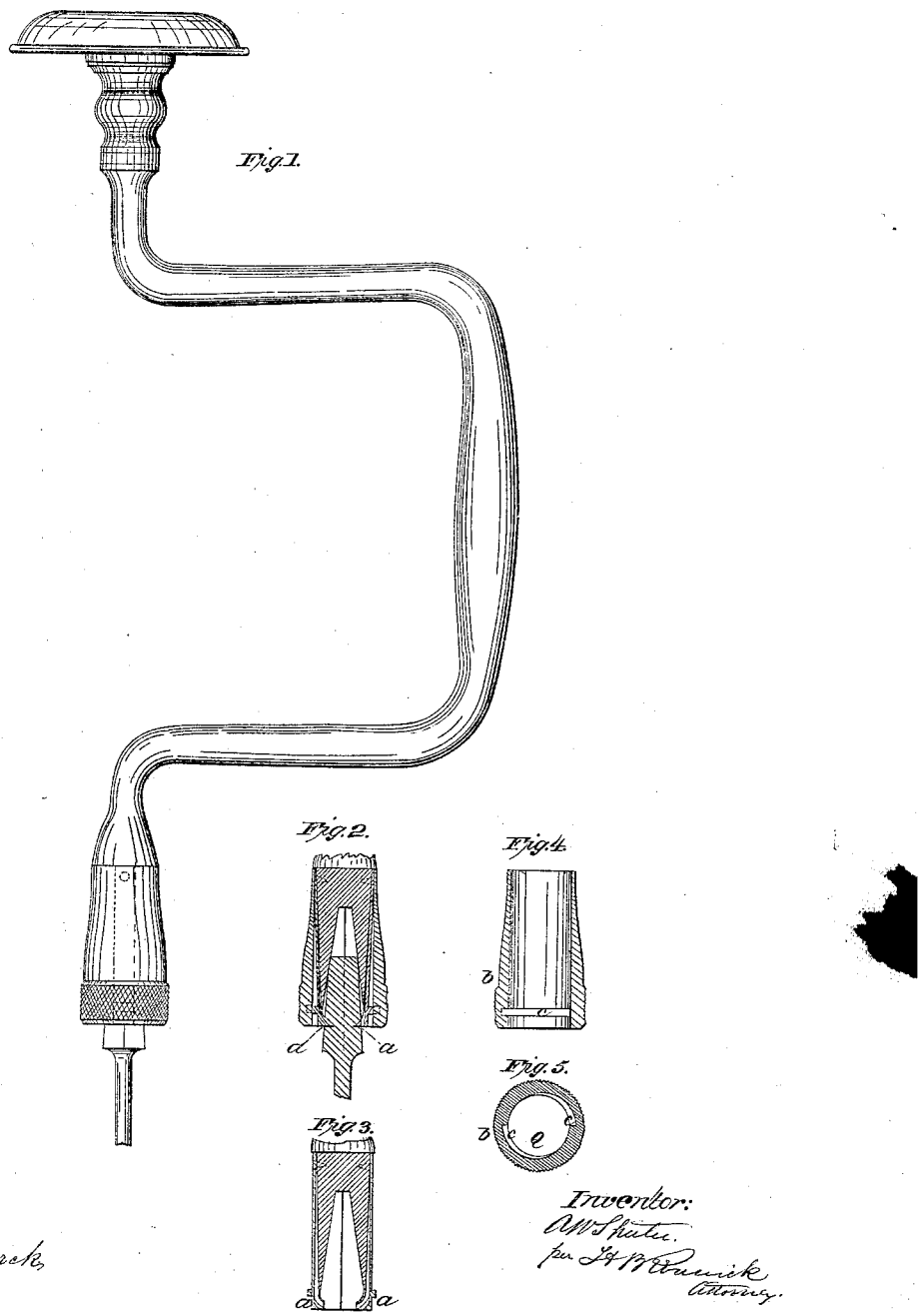

A. W. STREETER, OF SHELBURNE FALLS, MASSACHUSETTS.

Letters Patent No. 61,113, dated January 8, 1867.

---

IMPROVEMENT IN BIT-STOCKS.

---

The Schedule referred to in these Letters Patent and making part of the same.

---

TO ALL WHOM IT MAY CONCERN:

Be it known that I, A. W. STREETER, of Shelburne Falls, in the county of Franklin, and State of Massachusetts, have invented a new and useful Griping-Socket to be used in connection with a brace or other handle for boring or other tools; and that the following, taken in connection with the drawings, is a full, clear, and exact description thereof. In the drawings—

Figure 1 is an elevation of a brace with the griping-socket attached and the shank of a bit enclosed therein.
Figure 2 is a section through the axis of the bit, socket, and locking-ring.
Figure 3 is a section through the socket and griping-jaws.
Figure 4 is an axial section through the locking-ring; and
Figure 5 is a transverse section through the same in the plane of the cam-grooves.

The nature of my invention consists in combining with a tapering socket two griping-jaws, and a cam locking-ring, the jaws acting opposite to each other, or nearly so, and the cam-ring operating by its revolution to force the jaws against the tool-shank. The drawings show the plan in which I prefer to embody my invention, and in order to construct the contrivance therein represented, I first make a tapering socket, as clearly shown in figs. 2 and 3, in the end of a piece of metal, and I prefer to make this socket of a more abrupt taper than the shank of the tool to be held, as may be seen by reference to fig. 2, although a socket which is the counterpart of the shank of the tool, or of any other shape, so long as it will support and centre the tool-shank near its end, may be used. If this socket be square in its cross-section, I cut two passages at opposite corners of the square leading from the outside of the cylinder in which it is formed into the hollow of the socket, these passages being best shown in fig. 2, and to the outside of the cylinder I attach, by riveting or otherwise, two griping-jaws, a a, preferring to make these jaws with spring shanks, tending to force them outwards from the centre of the socket. In a socket of square cross-section these jaws have a notch, the two sides of which are perpendicular to each other, or nearly so, cut in them, and when the jaws are thrown out by their springs these notches coincide with the corners of the socket. I prefer to make these jaws with an edge, as shown in the drawings, so that they may bite into two of the corners of the tool-shank or into notches formed therein, (see fig. 2,) but the jaws may be made without such edges. I prefer to form upon each jaw a projecting spur, as shown in the drawings, and I apply outside of the jaws, and surrounding the cylinder in which the socket is formed, a cam-ring or ferrule, b. This ferrule has formed in it two cam-grooves, c c, and it is shoved into place by compressing the jaws until the spurs are on a line with the periphery of the cylinder. When in place, the spurs lie in the cam-grooves and prevent the falling off of the ferrule or locking-ring. The jaws may project outside of the cylinder and have grooves cut in them, in which a cam-ring will be supported and revolve, or the jaws may be without grooves and the cam-ring act upon their outer surfaces, the cam-ring being prevented from falling off by any proper device known to mechanics which will not interfere with its partial revolution. If the socket be circular in its cross-section, both the jaws must work in and out on the same diameter thereof, or nearly so, one of the objects of the contrivance being to cause the tool to be centered in the socket.

The operation of the contrivance is best shown by reference to fig. 2. The tool-shank is shoved in until it bears against the inside of the socket, thus centering the end of the shank; the ferrule is then turned, which causes the jaws to approach each other at the same speed, and they centre the shank at the griping-point and hold the shank and tool firmly in place. The turning of the ferrule in the opposite direction permits the jaws to recede and the tool may be withdrawn. The jaws may gripe at the open end of the socket, as represented, or may act at some distance from the open end, but must not gripe too near the point at which the shank bears on the inside of the socket, and should gripe the shank at a sufficient distance from the end supported in the stationary tapering socket to firmly support it in centre. One jaw will not centre the shank, and I do not claim a single jaw applied to a socket and acting to force a shank against the side of the cavity of a socket, the jaw being forced in by any proper mechanical contrivance; nor do I claim two griping-jaws by themselves and not combined with a socket to centre and support the end of the shank; nor do I claim a socket divided to form four griping-jaws which are closed by a locking-ring; but I do claim as of my own invention, the combination of two griping-jaws, an undivided socket to control the end of the shank of a tool, and a locking-ring turning concentrically around the socket to close and unclose the griping-jaws upon the tool, all being and acting in combination, substantially as specified.

A. W. STREETER.

Witnesses:
A. BOWEN,
J. W. SPRAGUE.